UNITED STATES PATENT OFFICE.

EDWIN M. ROBBINS, OF BUFFALO, NEW YORK.

PROCESS OF RECOLORING LEATHER.

No. 891,864.   Specification of Letters Patent.   Patented June 30, 1908.

Application filed April 29, 1907. Serial No. 370,924.

*To all whom it may concern:*

Be it known that I, EDWIN M. ROBBINS, citizen of the United States, residing at Buffalo, in the county of Erie and State of New York, have invented certain new and useful Improvements in Processes of Recoloring Leather; and I do hereby declare the following to be a full, clear, and exact description of the invention, such as will enable others skilled in the art to which it appertains to make and use the same.

This invention relates to the treatment of leather and analogous materials which have been previously colored or dyed, and has for its object to provide means whereby the colored or dyed surface of the material is rendered porous and the porosity of the body of the material beneath the colored or dyed surface increased, or placed in condition to receive and hold a coating containing coloring matter so that the surface is restored to its prior condition. To this end the invention consists generally of a process for treating the colored or dyed surface of the material to place the same in proper condition for receiving a new coating compound containing the requisite coloring matter, and thus resurface the material, the steps for carrying out such process being hereafter set forth and specifically pointed out in the claims.

In applying the improved process, the surface of the material, such as leather or the like, which has been previously tanned and colored or dyed, and which it is desired to re-color, is subjected to the action of a solution composed of an animal oil, a vegetable oil, spirits of ammonia and an alcoholic body, which penetrates the color or dye and renders the same porous or open, and also passes into the body of the material and separates the fibers thereof, and thus renders it more porous. The non-volatile portions of the compound are retained within the fibers of the material and serves as a preservative thereof, and are also adapted to unite with the second solution, which in its turn leaves a finished surface, as hereinafter explained.

The ingredients and proportions of this first or preliminary solution are as follows:—

Animal oil _____ 1 part.
Vegetable oil _____ 1 part.
Ammonia _____ 1 part.
An alcoholic body _____ 7 parts.

These ingredients are mixed in their natural state, with or without heat. The next and final step in the improved process consists in subjecting the previously treated surface, as above described, to a solution composed of a vegetable oil, a suitable drier, gum copal and a thinning solution, such as benzin, naphtha, turpentine, or any well known equivalent, which as above noted, unites with the portions of the first solution retained in the material.

This second solution is prepared as follows:
One gallon of vegetable oil is boiled from three to twelve hours, as may be required, the temperature varying from 300° to 600° F. During the cooling subsequent to the boiling above noted, the resultant is thinned to the proper consistency by adding three or four gallons of benzin, naphtha, turpentine, or the like, and the drier mixed with the solution together with a suitable coloring matter to obtain the proper shade. If a gloss is required from one to five ounces of gum copal to the gallon is added, but if a dull finish is required, the gum copal is omitted.

The animal oil employed will preferably be neat's-foot oil, or any good animal oil may be employed which will produce the same results.

The vegetable oil employed may be linseed oil preferably boiled, either alone or combined with what is commonly known as "tung" or "Chinese wood" oil, the employment of these ingredients imparting a quick and hard drying property to the compound, which will render it capable of withstanding heat and the action of the elements, and will not soften or deteriorate by exposure.

The function of the animal oil employed in the first step of the process is to renew the "life" of the leather, as old and worn leather has generally been exhausted of the fat and oil which was originally incorporated when the leather was tanned, and when leather in this condition has been treated by the first solution the pores are opened so that the leather absorbs the animal oil and thus renews its "life".

The function of the vegetable oil in the first solution is to produce a binding effect to aid in fixing the second solution to the surface to be colored, and for this purpose experiment has shown that the best results are obtained when using boiled linseed oil on account of its quick drying and binding qualities.

In the second step of the process no animal oil is employed, but a quick drying vegetable oil is used of an elastic, durable and drying nature, and as above stated boiled linseed oil meets the requirements, the addition of the tung or Chinese wood oil, which is well known to the trade, as a substitute or adjunct to linseed oil, increases the wearing qualities to a certain extent, but good results are produced by employing linseed oil only.

Material treated by the first step of the process is placed in condition to receive the indiscriminate application of any desired color and will thus produce a finish irrespective of the color or dye previously applied. Thus a material which has been previously dyed or colored dark can be recolored in a light shade, and a material which has been previously colored or dyed a light shade can be re-colored a dark shade. Thus all leather and like materials upon articles or structures such as chairs, sofas, carriage and automobile seats and backs, and other similar structures, can be re-colored without removal from the structures to which they are attached. The improved process is especially applicable to the upholstered portions of automobiles, carriage, and to the leather or other fabric coverings of vehicles of various kinds without the removal of the fabrics, or disturbing them in any manner.

The improved process can be effectually applied to the materials commonly known as pantasote and other of the well known substitutes for leather, or to colored or dyed canvas or other analogous fabrics.

Having thus described the invention, what is claimed as new is:—

1. The herein described process for re-surfacing fabric material which has been previously colored or dyed, consisting in first applying a solution substantially such as described capable of rendering the original colored or dyed surface porous, penetrating the body of the material to separate the fibers and remaining therein, and then applying to the surface so treated a solution substantially as described containing coloring matter and capable of penetrating the separated fibers of the material and adhering to the original colored or dyed material and uniting with the portions of the first solution remaining in the material.

2. The herein described process for re-surfacing fabric material which has been previously colored or dyed, which consists in first applying a solution composed of animal oil, vegetable oil, ammonia and an alcoholic body in about the proportions herein described, which solution remains in the material, and then applying to the material a solution composed of vegetable oil, a suitable thinning ingredient, and a suitable coloring matter in about the proportions and prepared in the manner herein described which unite with the portions of the first solution remaining in the material.

3. The herein described process for re-surfacing fabric material which has been previously colored or dyed, which consists first in applying a solution composed of animal oil, vegetable oil, ammonia, and an alcoholic body in about the proportions herein described, which solution remains in the material, and then applying to the material a solution composed of vegetable oil, a suitable thinning ingredient, a suitable coloring matter, and gum copal in about the proportions and prepared in the manner herein described which unite with the portions of the first solution remaining in the material.

4. A process for refinishing fabric material consisting in applying thereto a preliminary softening solution comprising a volatile solvent and oils adapted to unite with a second refinishing solution, then applying a refinishing solution comprising oil adapted to unite with the residue of the preliminary solution.

5. A process for refinishing fabric material consisting in applying thereto a preliminary softening solution comprising a volatile solvent, ammonia, and oils adapted to unite with a second refinishing solution, then applying a refinishing solution comprising oil adapted to unite with the residue of the preliminary solution.

6. A process for refinishing fabric material consisting in applying thereto a preliminary softening solution comprising a volatile solvent and oils adapted to unite with a second refinishing solution, then applying a refinishing solution comprising oil and coloring matter and adapted to unite with the residue of the preliminary solution.

7. A process for refinishing fabric material consisting in applying thereto a preliminary softening solution comprising a volatile solvent, ammonia, and oils adapted to unite with a second refinishing solution, then applying a refinishing solution comprising oil and coloring matter and adapted to unite with the residue of the preliminary solution.

In testimony whereof, I have signed my name to this specification, in the presence of two subscribing witnesses.

EDWIN M. ROBBINS.

Witnesses:
W. T. MILLER,
GEO. H. FISHER.